(12) United States Patent
Yong

(10) Patent No.: US 6,490,384 B2
(45) Date of Patent: Dec. 3, 2002

(54) LIGHT MODULATING SYSTEM USING DEFORMABLE MIRROR ARRAYS

(76) Inventor: Yoon-Joong Yong, 199-201 Cheongnyangni 2-Dong, Dongdaemun-Gu, Seoul, 130-012 (KR)

( * ) Notice: Subject to any disclaimer, the term of this patent is extended or adjusted under 35 U.S.C. 154(b) by 0 days.

(21) Appl. No.: 09/824,731

(22) Filed: Apr. 4, 2001

(65) Prior Publication Data

US 2002/0146197 A1 Oct. 10, 2002

(51) Int. Cl.⁷ .............................. G02B 6/26; G02B 6/42
(52) U.S. Cl. ........................ 385/17; 359/223; 359/224
(58) Field of Search ..................... 385/16–19; 359/224, 359/223, 290, 291

(56) References Cited

U.S. PATENT DOCUMENTS

| 5,345,521 | A |   | 9/1994  | MdDonald et al. | 385/16  |
|-----------|---|---|---------|-----------------|---------|
| 5,444,801 | A |   | 8/1995  | Laughlin        | 385/16  |
| 5,960,133 | A | * | 9/1999  | Tomlinson       | 385/18  |
| 6,253,001 | B1| * | 6/2001  | Hoen            | 385/16  |
| 6,300,665 | B1| * | 10/2001 | Peeters et al.  | 257/415 |
| 6,330,102 | B1| * | 12/2001 | Daneman et al.  | 359/290 |
| 6,374,008 | B2| * | 4/2002  | Solgaard et al. | 359/224 |

FOREIGN PATENT DOCUMENTS

| EP | 0 525 395 A1 | 6/1992 |
| EP | 0 932 066 A1 | 7/1999 |

* cited by examiner

Primary Examiner—John D. Lee
Assistant Examiner—Scott A Knauss
(74) Attorney, Agent, or Firm—Bacon & Thomas

(57) ABSTRACT

An optical switching system modulates two-directional optical paths of optical signals from fiber to fiber. The optical switching system includes an array of input optical fibers for receiving the optical signals from outside, an array of first deformable mirrors for modulating first-directional optical paths of the optical signals, an array of second deformable mirrors for modulating second-directional optical paths of the optical signals, and an array of output optical fibers for routing the optical signals to outside. Each of the optical signals travels from an input optical fiber to a destined output optical fiber via a first and a second deformable mirror. The optical switching system provides a 2-axes switching capability of the optical signal by utilizing twice one-directional modulator, each being involved for determining one-directional address of the optical signal, which will, in turns, achieve all-switching capability between multiple optical channels from fiber to fiber.

12 Claims, 4 Drawing Sheets

LIGHT MODULATING SYSTEM USING DEFORMABLE MIRROR ARRAYS

FIELD OF THE INVENTION

The present invention relates to a light modulating system; and, more particularly, to an optical switching system for use in the light modulating system, wherein the optical switch provides 2-axes switching capability from fiber to fiber with deformable mirror arrays.

BACKGROUND OF THE INVENTION

Switching systems are well known in the communications field. In the telecommunications field the switching systems are used to route calls from point to point. In this regard, the switching systems may be embodied in a central office (CO) or an exchange, and such switching systems are often utilized for routing signals. Thus, a signal from a caller at a first endpoint passes through a local exchange (or central office) and perhaps several other Intermediate exchanges, in route to the destination or called endpoint.

Recently, certain optical devices have been developed, which allow certain limited multiplexing capability in the optical domain. For example, wavelength division multiplexing (WDM) technology offers a practical solution for multiplexing many high-speed channels at different optical carrier frequencies and transmitting them over a common fiber. As is known, WDM is conceptually similar to frequency division multiplexing in the electrical domain, except that a plurality of optical signals (of differing wavelength) are communicated through a common optical fiber. A significant limitation, however, to switching systems is observed at an exchange. When certain signals from incoming optical trunks are switched, or routed, to output trunks, these systems require an optical-electrical-optical conversation. This results in decreasing both the speed and traffic-handling capacity of networks as well as increasing the operational cost associated with the conversion process.

Several methods and structures of optical switching using micro-mechanical modulators have been proposed to direct optical signal from fiber to fiber in the networks.

In one method and structure, a reflective surface is supported by a flexible hinge or flange over addressing circuitry having two electrodes with a gap intervening therebetween, which is disclosed in U.S. Pat. No. 5,774,604, and entitled "USING AN ASYMMETRIC ELEMENT TO CREATE A 1×N OPTICAL SWITCH". When one electrode is activated by application of a voltage, the surface will be selectively attracted toward that electrode as a result of electrostatic forces. In this way, the structure becomes an addressable 1×2 switch. Additionally, a stepped offset mirror is equipped and the position of the reflected beam becomes adjustable with more than one state, in such a way that the structure becomes a 1×N switch.

Another method is shown in U.S. Pat. No. 5,208,880, entitled "MICRODYNAMICAL FIBER-OPTIC SWITCH AND METHOD OF SWITCHING USING SAME". A mirror is mechanically coupled to a meander piezoelectric actuator by an actuating arm such that the mirror is displaced along a mirror displacement path in correspondence to deflection of the meander piezoelectric actuator. In 1×N optical switch, the mirror is oriented at substantially 45 degrees such that light reflecting path is substantially perpendicular to incident light.

However, there are certain drawbacks associated with the methods described above. The structures only enable a 1×N switching capability. In other words, the methods using the above structures fail to provide switching capability in case that 2-axes switching is required for utilizing a multiple input channel.

SUMMARY OF THE INVENTION

It is, therefore, an object of the present invention to provide an optical switching system for obtaining 2-axes switching capability from fiber to fiber by using arrays of M×N deformable mirrors, wherein M and N are predetermined integers.

In accordance with an aspect of the present invention, there is provided an optical switching system comprising: an input part for receiving optical signals from outside; at least two modulators, each of the modulators being involved in modulating one-directional optical paths of the optical signals; and an output part for routing the optical signals to outside.

In accordance with another aspect of the present invention, there is provided an optical switching system comprising: an input part including an array of input optical fibers, each of input optical fibers being disposed to receive an optical signal from outside; a first modulator, for determining a first-directional address of the optical signal, including an array of first deformable mirrors and a first reflector, each of the input optical fibers having an address that corresponds to a first deformable mirror having the same address on a one-to-one basis; a second modulator, for determining a second-directional address of the optical signal, including an array of second deformable mirrors and a second reflector; and an output part including an array of output optical fibers, each of the output optical fibers disposed to transmit the optical signal to outside and having an address that corresponds to a second deformable mirror having a same address on a one-to-one basis.

In accordance with still another aspect of the present invention, there is provided an optical switching system comprising: an input part including an array of M×N input optical fibers, each of input optical fibers being disposed to receive an optical signal from outside; a first modulator, for determining a first-directional address of the optical signal, including an array of M×N first deformable mirrors and an array of M×N first compensating deformable mirrors, each of the input optical fibers having an address that corresponds to a first deformable mirror having the same address on a one-to-one basis; a second modulator, for determining a second-directional address of the optical signal, including an array of M×N second deformable mirrors; and an output part including an array of M×N output optical fibers and an array of M×N second image lenses, each of the output optical fibers disposed to transmit the optical signal to outside and having an address that corresponds to a second deformable mirror having the same address on a one-to-one basis, and each of the imaging lenses collimating the optical signal onto an output optical fiber, wherein M and N are predetermined integers, respectively.

In accordance with still another aspect of the present invention, there is provided an optical switching system comprising: an input/output part including an array of M×N input optical fibers and an array of M×N image lenses, each of the input/output optical fibers being disposed to receive an optical signal and transmit it to outside; a first modulator, for determining a first-directional address of the optical signal, including an array of M×N first deformable mirrors and an array of M×N first compensating deformable mirrors; and a second modulator, for determining a second-directional address of the optical signal, including an array of M×N second deformable mirrors and an array of M×N second compensating deformable mirrors, wherein M and N are predetermined integers, respectively.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

An inventive optical switching system comprises an input part including an array of M×N input optical fibers, a first modulator including one or more arrays of M×N first deformable mirrors, a second modulator including one or more arrays of M×N second deformable mirrors, and an output part including an array of M×N output optical fibers, wherein M and N are predetermined integers, respectively. Each of the input optical fibers having an address corresponds to a first deformable mirror having the same address by one to one basis and, hence, a second deformable mirror and an output optical fiber, wherein the term "address" indicates a position in the array determined by an ordinal in each of a first and a second direction, e.g., row and column, the first and the second direction being not parallel to each other.

Each of the input optical fibers in the input part is disposed to receive an optical signal from outside and to transmit it to the first modulator.

The first modulator determines a first-directional address of the optical signals by using the array of M×N first deformable mirrors and then transmits the optical signals to the second modulator.

The second modulator determines a second-directional address of the optical signals by using the array of M×N second deformable mirrors and then transmits the optical signals to the array of M×N output optical signals.

Each of the output optical fibers in the output part transmits the optical signal to outside.

Figure 1:
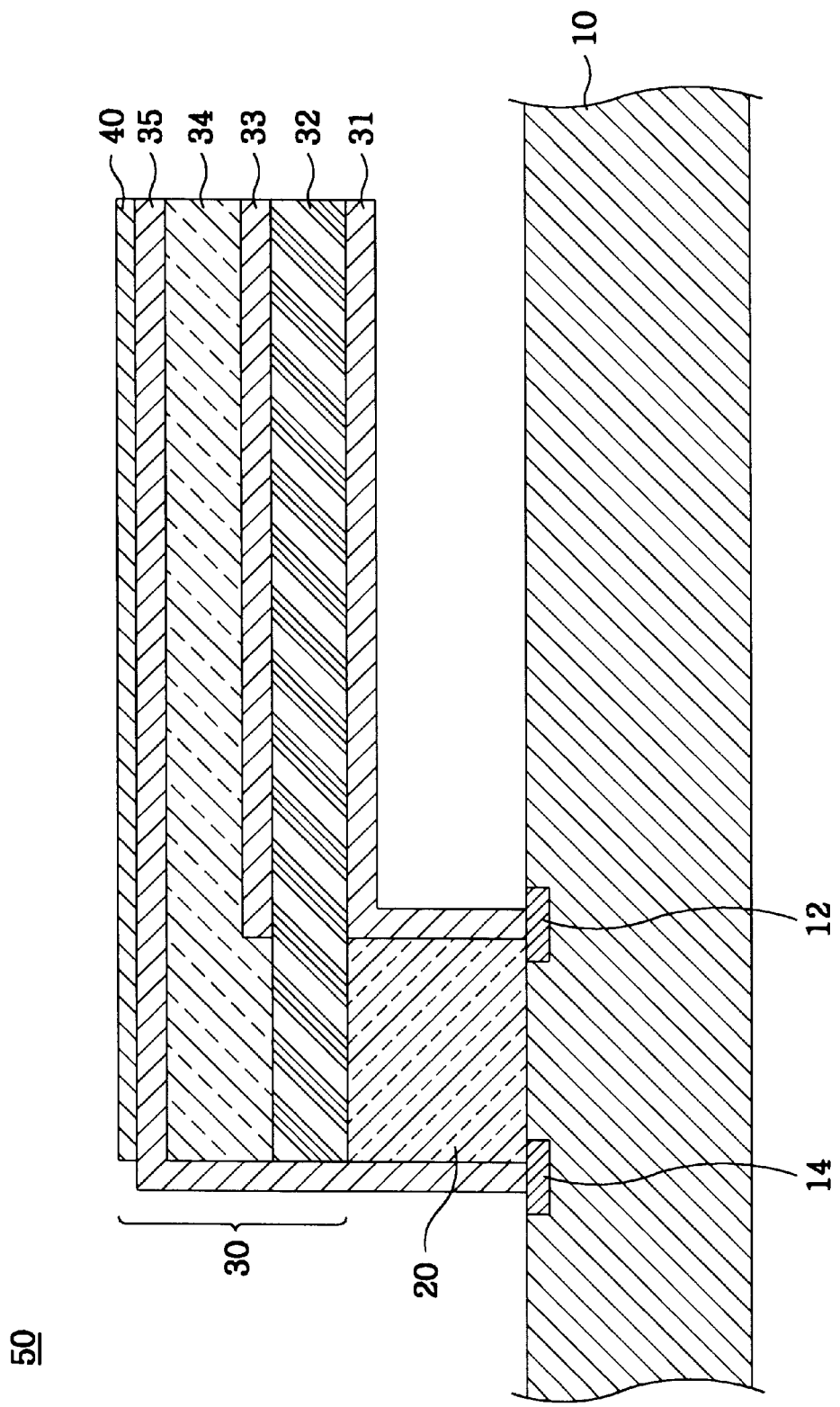
FIG. 1 is a schematic cross sectional view setting forth a deformable mirror incorporated in an optical switching system in accordance with the present invention.

FIG. 1 is a schematic cross sectional view setting forth a deformable mirror 50 incorporated in the optical switching system in accordance with the present invention. The deformable mirror 50 includes a substrate 10, a supporter 20, a piezoelectric actuator 30 and a mirror 40. The substrate 10 has a first and a second connecting terminal 12, 14 which are connected to an electrical circuit (not shown) to receive an electrical signal. The piezoelectric actuator 30 is cantilevered from the substrate 10 with one side thereof being affixed to the supporter 20 and another opposite side being apart from the substrate 10. The piezoelectric actuator 30 has a first and a second electrode 31, 35, a first and a second motion-inducing layer 32, 34 made of a piezoelectric material, and an intermediated electrode 33, wherein the first and the second electrode 31, 35 are electrically connected to the first and the second connecting terminal 12, 14, respectively, thereby each functioning as a signal electrode, and the intermediate electrode 33 is electrically connected to ground, thereby functioning as a bias electrode. The mirror 40 is attached to top of the piezoelectric actuator 30. When the various electrical signals are applied to the first electrode 31 through the first connecting terminal 12, the first motion-inducing layer 32 is continuously expanded or retracted according to the electrical field formed between the first electrode 31 and the intermediate electrode 33, but the second motion-inducing layer 34 still remains same, resulting in the piezoelectric actuator 30 being deformed upwardly or downwardly. On the other hand, when the various electrical signals are applied to the second electrode 35, the second motion-inducing layer 34 is continuously expanded or retracted according to the electrical field formed between the second electrode 35 and the intermediate electrode 33, but the first motion-inducing layer 32 still remains same, resulting in the piezoelectric actuator 30 being deformed downwardly or upwardly. Other deformable mirrors that can be employed in the present invention are disclosed in U.S. Pat. Nos. 5,661,611, 5,760,947 and 5,835,293, assigned by DAEWOO ELECTRONICS CO., LTD.

Further details for the optical switching system in accordance with the present invention will now be described by way of illustration based on the following embodiments and accompanying drawings.

First Embodiment

Figure 2:
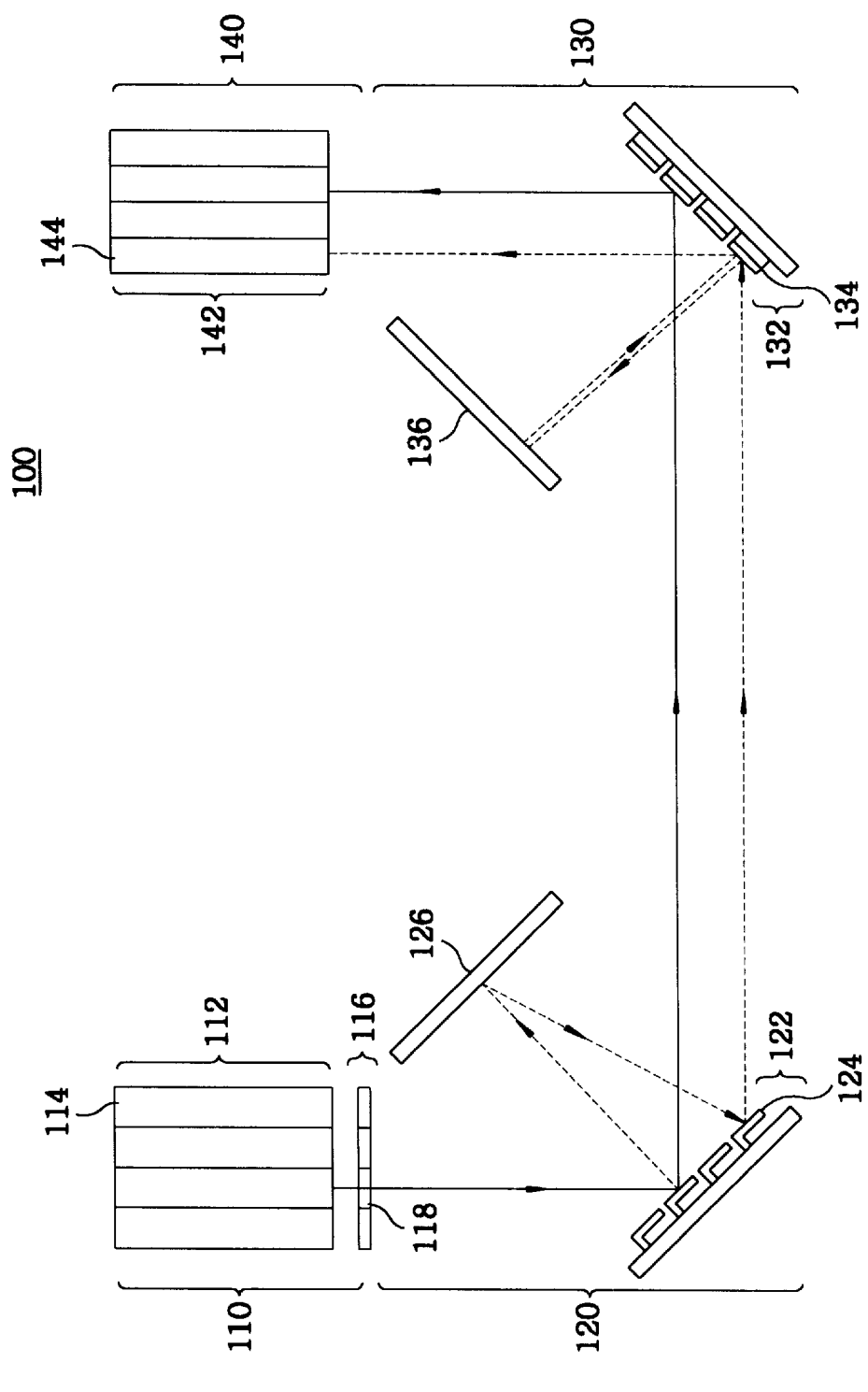
FIG. 2 shows a schematic view illustrating an optical switching system in accordance with a first embodiment of the present invention.

An optical switching system 100 comprises an input part 110 including an array 112 of M×N input optical fibers 114 and an array 116 of M×N image lenses 118, a first modulator 120 including an array 122 of M×N first deformable mirrors 124 and a first reflector 126, a second modulator 130 including an array 132 of M×N second deformable mirrors 134 and a second reflector 136, and an output part 140 including an array 142 of M×N output optical fibers 144, as shown in FIG. 2. An element in each of arrays 112, 116, 122, 132 and 142 has an address determined by an ordinal in each of a first and a second direction, wherein the first direction is parallel to a Y-Z plane defined in an XYZ coordinate system as shown in FIG. 2 while the second direction is normal to the Y-Z plane.

The input optical fiber arrays 112 is disposed to receive optical signals from outside and to transmit them to the first deformable mirror array 122. The image lens array 116 is installed between the input optical fiber array 112 and the first deformable mirror array 122, each of the image lens 118 in the array 116 collimating an optical signal from a corresponding input optical fiber 114 to a corresponding first deformable mirror 124.

The first deformable mirror array 122 is slanted to face both the input optical fiber array 112 and the second deformable mirror array 132. Each of the first deformable mirrors 124 is cantilevered with an actuating side extending from an affixed opposite side along with the first direction. The first reflector 126 is installed apart from and parallel to the first deformable mirror array 122.

The second deformable mirror array 132 is inclined to face both the first deformable mirror array 122 and the output optical fiber array 142. Each of the second deformable mirrors 134 is cantilevered with an actuating side extending from an affixed opposite side along with the second direction. The second reflector 136 is installed apart from and parallel to the second deformable mirror array 132.

The output optical fiber array 142 is disposed to transmit the optical signals to outside.

The following description represents modulations of the optical path of an optical signal in accordance with this embodiment of the present invention.

The optical signal in an input optical fiber 114 having an address (P×Q) is transmitted to a first deformable mirror 124 having the same address (P×Q) via an imaging lens 118 of address (P×Q), wherein P and Q are integers equal to or smaller than M and N, respectively.

When the (P×Q) first deformable mirror 124 sets in a ground state (not deformed), the optical signal is reflected to a (P×Q) second deformable mirror 134 of the second modulator 130. On the contrary, when the (P×Q) first deformable mirror 124 sets in an excited state (deformed) in response to an electrical signal applied thereto, the optical signal is transmitted to another first deformable mirror 124 having a different address (P'×Q) via the first reflector 126 and then reflected from a (P'×Q) first deformable mirror 124 to a (P'×Q) second deformable mirror 134 of the second modulator 130, wherein the (P'×Q) first deformable mirror 124 also sets in an excited state so as to compensate an incident angle difference between the optical signal transmitted from (P'×Q) input optical fiber 114 and that from the (P×Q) first deformable mirror 124.

The former optical signal is reflected from the (P×Q) second deformable mirror 134 setting in the ground state to a (P×Q) output optical fiber 144 of the output part 140. The latter optical signal is transmitted from the (P'×Q) second deformable mirror 134 setting in an excited state to other (P'×Q') second deformable mirror 134 via the second reflector 136 and then reflected to a (P'×Q') output optical fiber 144 in the output part 140, wherein the (P'×Q') second deformable mirror 134 also sets in an excited state in order to compensate an incident angle difference between the optical signal transmitted from (P'×Q) second deformable mirror 134 and that from the (P'×Q') first deformable mirror 124.

The optical signal is then routed from the output optical fiber to outside.

Second Embodiment

Figure 3:
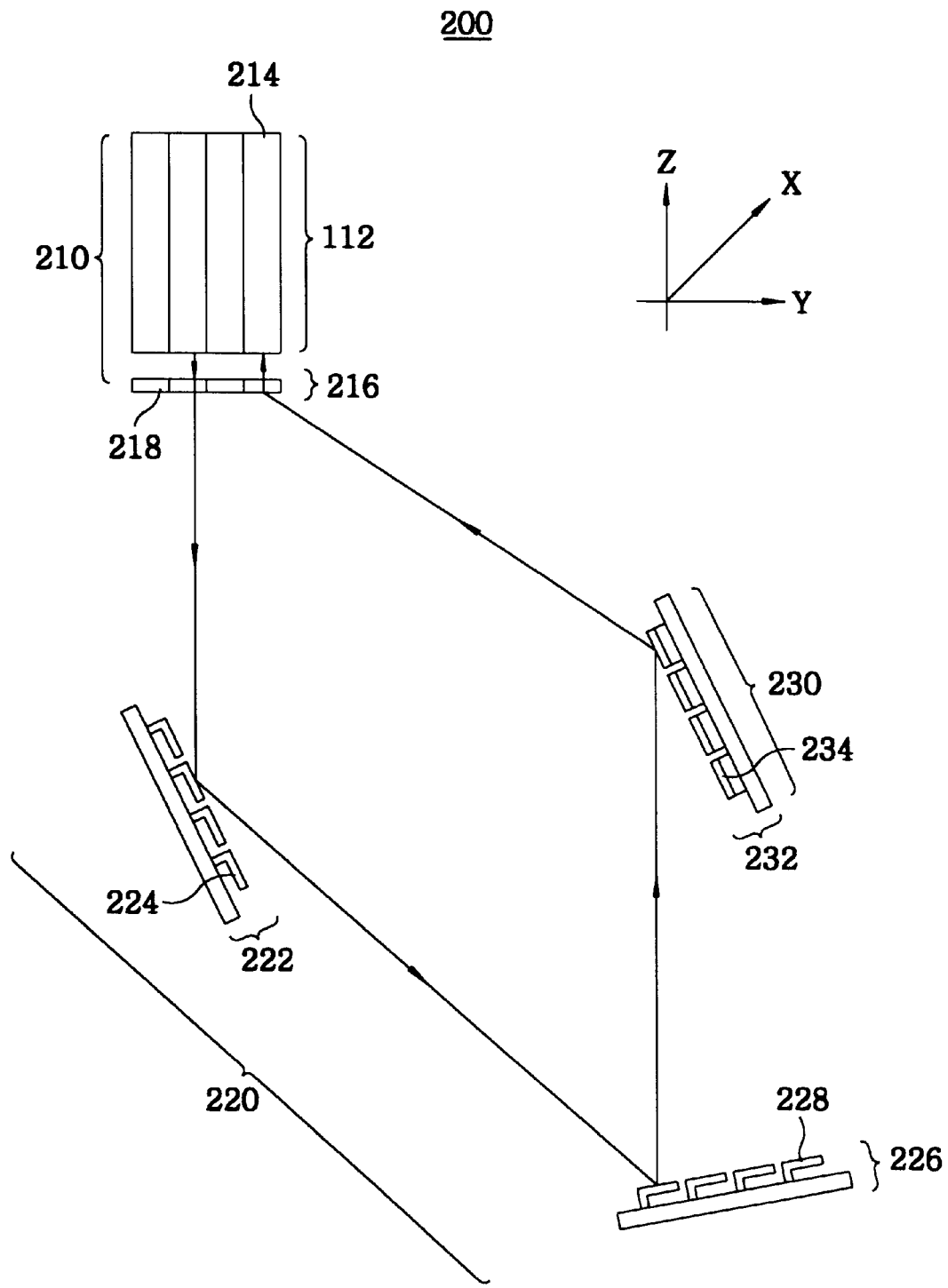
FIG. 3 offers a schematic view depicting an optical switching system in accordance with s second embodiment of the present invention.

An optical switching system 200 comprises an input/output part 210 including an array 212 of M×N input/output optical fibers 214 and an array 216 of M×N image lenses 218, a first modulator 220 including an array 222 of M×N first deformable mirrors 224 and an array 226 of M×N first compensating deformable mirrors 228, and a second modulator 230 including an array 232 of M×N second deformable mirrors 234, as shown in FIG. 3.

The optical switching system 200 of this embodiment is similar to that of the first embodiment except for the integration of the input part 110 and the output part 140, the employment of the first compensating deformable mirror array 226 instead of the first reflector 126 and the removal of the second reflector 136. Each of the first compensating deformable mirrors 228 is cantilevered with an actuating side extending from an affixed opposite side along with the first direction similar to the first deformable mirror 224.

A modulation of an optical path for an optical signal from an input/output optical fiber 214 having an address (P×Q) to another input/output optical fiber 214 having a different address (P'×Q') is described as follows in accompanying with FIG. 3.

First, the optical signal from the (P×Q) input/output optical fiber 214 is collimated onto a (P×Q) first deformable mirror 224 of the first modulator 220 by using a (P×Q) first image lens 218. Thereafter, the optical signal is reflected from an excited (P×Q) first deformable mirror 224 to an excited (P'×Q) first compensating deformable mirror 228 in the first modulator 220 and then transmitted to a (P'×Q) second deformable mirror 234 of the second modulator 230, wherein the first deformable mirror 224 is utilized to change the first-directional address of the optical signal and the first compensating deformable mirror 228 is involved in compensating an incident angle difference between the optical signal transmitted from the (P×Q) first deformable mirror 224 and that from the (P'×Q) first deformable mirror 224. Then, the optical signal is transmitted from the excited (P'×Q) second deformable mirror 234 to a (P'×Q') input/output optical fiber 244 of the input/output part 240 via a (P'×Q') second image lens 248, wherein although the optical signal is transmitted askance to the input/output part 210, the second image lens 248 collimates the optical signal to a corresponding optical fiber 244.

Third Embodiment

Figure 4:
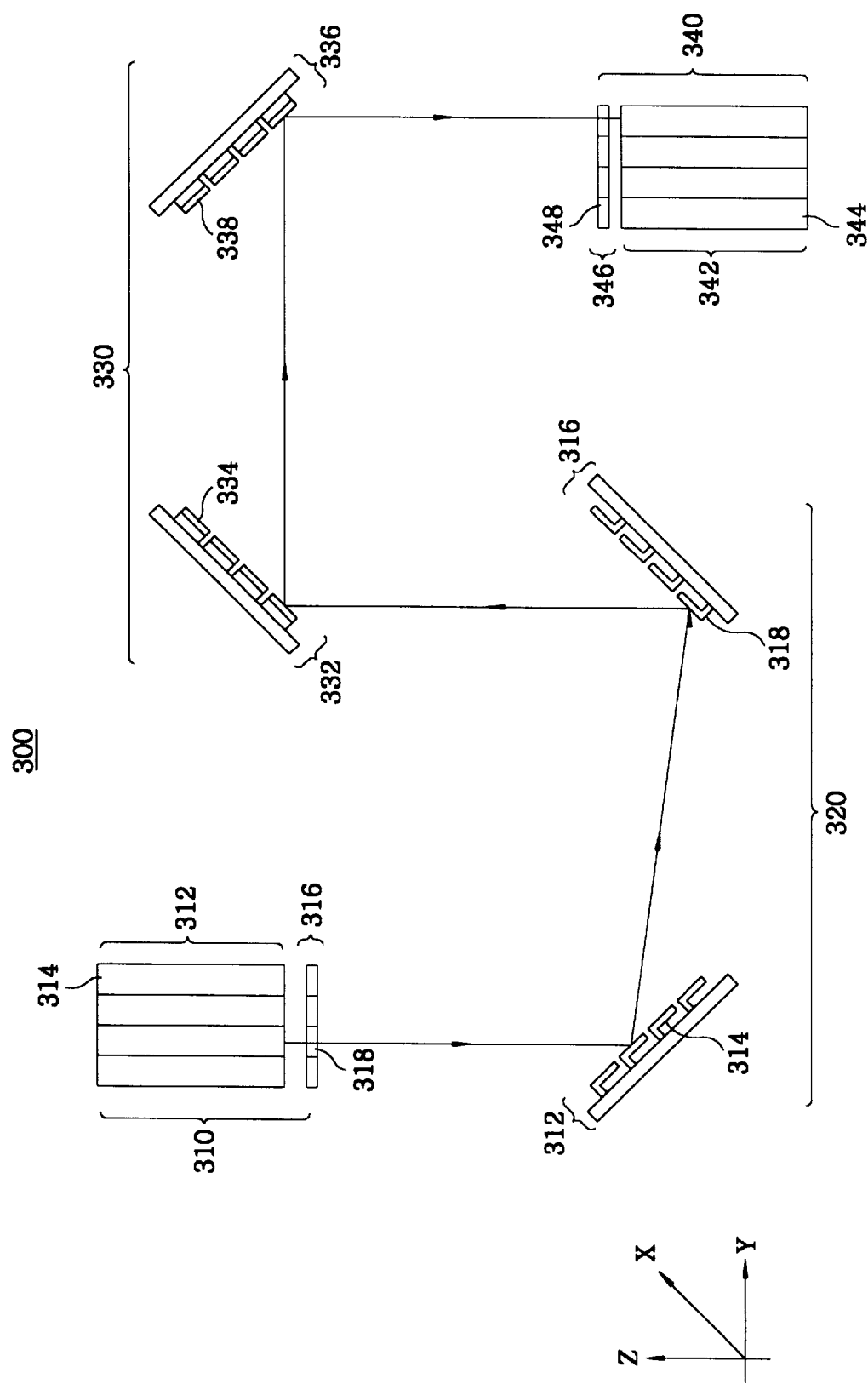
FIG. 4 represents a schematic view portraying an optical switching system in accordance with a third embodiment of the present invention.

An optical switching system 300 comprises an input part 310 including an array 312 of M×N input optical fibers 314 and an array 316 of M×N first image lens 318, a first modulator 320 including an array 322 of M×N first deformable mirrors 324 and an array 326 of M×N first compensating deformable mirrors 328, a second modulator 330 including an array 332 of M×N second deformable mirrors 334 and an array 336 of M×N second compensating deformable mirrors 338, and an output part 340 including an array 342 of M×N output optical fibers 344 and an array 346 of M×N second image lenses 348, as shown in FIG. 4.

The optical switching system 300 of this embodiment is similar to that of the first embodiment except that the first and the second compensating deformable mirror array 326, 336 are employed in the first and the second modulator 320, 330, respectively, instead of the first and the second reflector 126, 136.

A transmission of an optical signal from a (P×Q) input optical fiber 314 to a (P'×Q') output optical fiber 344 is described as follows with reference to FIG. 4. The optical signal is collimated to a (P×Q) first deformable mirror 324 by using a (P×Q) first image lens 318. Next, the optical signal is reflected from the (P×Q) first deformable mirror 324 to a (P'×Q) first compensating deformable mirror 328 and then transmitted to a (P'×Q) second deformable mirror 334. Thereafter, the optical signal is reflected from the (P'×Q) second deformable mirror 334 to a (P'×Q') second compensating deformable mirror 338 and then transmitted to the (P'×Q') output optical fiber 344 via a (P'×Q') image lens 348.

It is apparent that the invention, as described above, provides the 2-axes switching capability of the optical signal by utilizing one-directional modulator twice, each being involved in determining one-directional address of the optical signal, which will, in turns, achieve all-switching capability between multiple optical channels from fiber to fiber.

While the present invention has been shown and described with respect to the particular embodiments, it will be apparent to those skilled in the art that many changes and modifications may be made without departing from the spirit and scope of the invention defined in the appended claims.

What is claimed is:

1. An optical switching system comprising:
   an input part including an array of input optical fibers, each of input optical fibers being disposed to receive an optical signal from outside;
   a first modulator, for determining a first-directional address of the optical signal, including an array of first deformable mirrors and a first reflector;

a second modulator, for determining a second-directional address of the optical signal, including an array of second deformable mirrors and a second reflector; and an output part including an array of output optical fibers, each of the output optical fibers disposed to transmit the optical signal to outside, wherein each of the input optical fibers has an address that corresponds to a first deformable mirror having the same address on a one-to-one basis, and each of the output optical fibers has an address that corresponds to a second deformable mirror having the same address on a one-to-one basis, and wherein the first deformable mirror array is slanted to face both the input optical fiber array and the second deformable mirror array, and the first reflector is set apart from and parallel to the first deformable mirror array.

2. The optical switching system of claim 1, wherein each of the deformable mirrors includes a piezoelectric actuator for continuously changing the optical path of the optical signal with respect to an electric field applied thereto.

3. The optical switching system of claim 1, wherein the input part further includes an array of imaging lenses disposed between the input optical fiber array and the first deformable mirror array, each of the imaging lenses collimating the optical signal onto a corresponding first deformable mirror.

4. The optical switching system of claim 1 wherein when each of the first deformable mirrors sets in a ground state, the optical signal is reflected to a corresponding second deformable mirror of the second modulator, and when each of the first deformable mirrors sets in an excited state, the optical signal is transmitted to another first deformable mirror having a different address via the first reflector and then reflected to a second deformable mirror corresponding to said another first deformable mirror, said another first deformable mirror setting in an excited state so as to compensate an incident angle difference between the optical signal transmitted from an input optical fiber corresponding to said another first deformable mirror and that transmitted from the first deformable mirror.

5. The optical switching system of claim 1, wherein the second deformable mirror array is inclined to face both the first deformable mirror array and the output optical fiber array, and the second reflector sets apart from and parallel to the first deformable mirror array.

6. The optical switching system of claim 5, wherein when each of the second deformable mirrors sets in a ground state, the optical signal is reflected to a corresponding output optical fiber of the output part, and when each of the second deformable mirrors sets in an excited state, the optical signal is transmitted to another second deformable mirror via the second reflector and then reflected to an output optical fiber corresponding to said another second deformable mirror, said another second deformable mirror setting in an excited state so as to compensate an incident angle difference between the optical signal transmitted from a first deformable mirror corresponding to said another second deformable mirror and that transmitted from the second deformable mirror.

7. An optical switching system comprising:

an input/output part including an array of M×N input/output optical fibers, M and N being predetermined integers, respectively, and an array of M×N image lenses, each of input/output optical fibers being disposed to receive and route an optical signal from and to outside;

a first modulator, for determining a first-directional address of the optical signal, including an array of M×N first deformable mirrors and an array of M×N first compensating deformable mirrors; and a second modulator, for determining a second-directional address of the optical signal, including an array of M×N second deformable mirrors.

8. The optical switching system of claim 7, wherein each of the deformable mirrors includes a piezoelectric actuator for continuously changing an optical path of the optical signal with respect to an electric field applied thereto.

9. The optical switching system of claim 7, wherein each of the input optical fibers having an address corresponds to a first deformable mirror having the same address by one to one basis and, hence, a first compensating deformable mirror, a second deformable mirror and an output optical fiber.

10. The optical switching system of claim 9, wherein each of the image lenses is disposed in front of the input optical fiber array so as to collimate the optical signal from the input/output optical fiber to the first deformable mirror and from the second deformable mirror to the input/output optical fiber.

11. The optical switching system of claim 9 wherein the first modulator is disposed between the input/output part and the second modulator, each of the first deformable mirrors in the first modulator being utilized to change the first-directional address of the optical signal and each of the first compensating deformable mirrors in the first modulator being involved in compensating an incident angle of the optical signal so as to transmit the optical signal to a corresponding second deformable mirror.

12. The optical switching system of claim 9, wherein the second deformable mirror array of the second modulator is disposed between the first modulator and the input/output part, each of the first deformable mirrors being utilized to change the second-directional address of the optical signal.

* * * * *